United States Patent [19]

Azuma

[11] 3,972,506

[45] Aug. 3, 1976

[54] AUTOMATIC, REMOTE OPERATOR FOR MANUALLY OPERABLE VALVE

[76] Inventor: Shojiro Azuma, No. 591-28, Katakura-cho, Hachioji, Tokyo, Japan

[22] Filed: Apr. 22, 1975

[21] Appl. No.: 570,950

[52] U.S. Cl. .............................. 251/133; 251/134
[51] Int. Cl.² ....................................... F16K 31/04
[58] Field of Search ........................... 251/133, 134

[56] References Cited
UNITED STATES PATENTS

| | | | |
|---|---|---|---|
| 2,469,786 | 5/1949 | Rieber | 251/133 X |
| 2,992,377 | 7/1961 | Ekstrom, Jr. | 251/134 X |

FOREIGN PATENTS OR APPLICATIONS

| | | | |
|---|---|---|---|
| 265,824 | 2/1927 | United Kingdom | 251/133 |

*Primary Examiner*—Arnold Rosenthal
*Attorney, Agent, or Firm*—Cushman, Darby & Cushman

[57] ABSTRACT

A valve having a handwheel that must be rotated more than 360° to operate the valve between a fully open and a fully closed condition is further provided with a powered, remotely operable unit for opening and closing the valve. The unit includes means for transmitting to the control station an indication of whether and to what degree the valve is in an open condition. This unit is also provided with a limit switch means for cutting power from being applied to further open or close the valve when the valve respectively becomes fully open or fully closed and a torque limiting means for preventing damage to the unit when jamming or clogging resists powered, remote opening or closing of the valve.

3 Claims, 3 Drawing Figures

AUTOMATIC, REMOTE OPERATOR FOR MANUALLY OPERABLE VALVE

BACKGROUND OF THE INVENTION

I have disclosed in my prior U.S. Pat. No. 3,847,039, issued Nov. 12, 1974, a device for applying rotary force to one or more valves from a motorized operator via a flexible shaft that terminates in a worm in driving relation to a gear on the valve stem. Devices of this type are applied in the piping of factories, power plants, water supplies and sewer systems. Even so, it has been necessary to operate such valves from close by, in order to permit an observation to be made of the degree of openness of the valve, and to prevent over-torquing of the valve stem due to inadvertent continued application of power after the valve has reached a fully open or fully closed position, or because the valve, although not fully open or fully closed has become jammed or clogged.

SUMMARY OF THE INVENTION

A valve having a handwheel that must be rotated through more than 360° to operate the valve between a fully open and fully closed condition is further provided with a powered, remotely operable unit for opening and closing the valve. The unit includes means for transmitting to the control station an indication of whether and to what degree the valve is in an open condition. This unit is also provided with a limit switch means for cutting power from being applied to further open or close the valve when the valve becomes respectively fully open or fully closed and a torque limiting means for preventing damage to the unit when jamming or clogging resists powered, remote opening or closing of the valve.

The principles of the invention will be further discussed with reference to the drawings wherein preferred embodiments are shown. The specifics illustrated in the drawings are intended to exemplify, rather than limit, aspects of the invention as defined in the claims.

DETAILED DESCRIPTION

Figure 1:
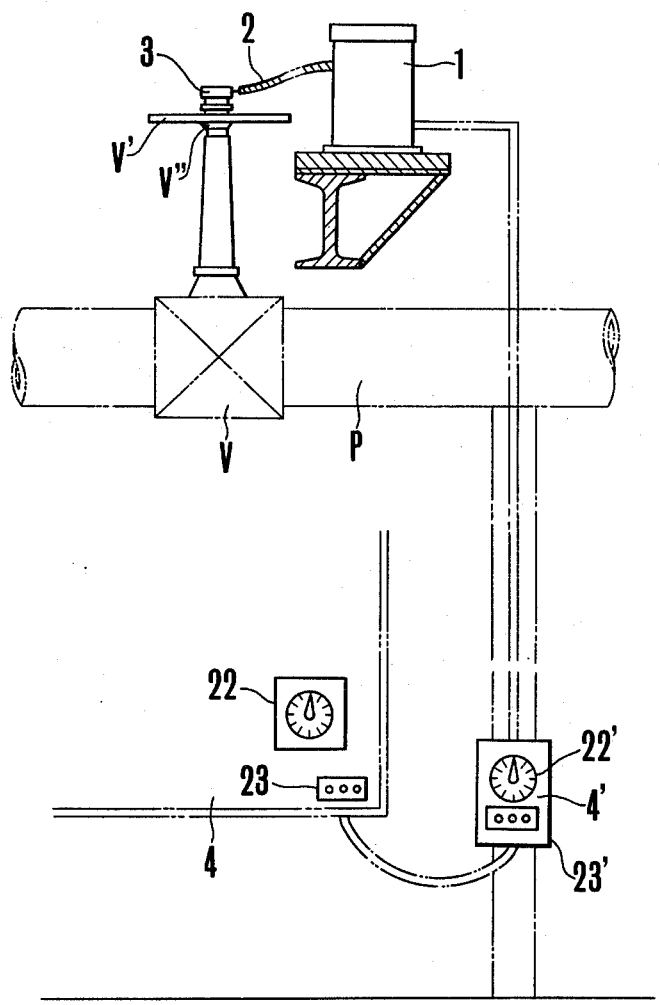
FIG. 1 is a schematic view of a valve provided with a powered operator which may be operated either from a close-by panel, or from a remote panel.

In FIG. 1, P is a pipeline for a fluid whose flow is to be controlled by a valve V interposed in the pipeline. The valve V has a manually rotatable handwheel V' secured on the valve stem V'', and which needs to be turned through more than 360° in order to bring the valve to a fully open state from a fully closed state and vice versa.

The powered valve opening and closing unit 1 is stationed near the valve V and is operably connected to a worm gear 3 secured on the valve stem, via a flexible, rotary shaft 2 having a worm (not shown) in rotary driving engagement with the worm gear 3. Within the unit 1, are provided motor means for rotating the shaft 2 and other equipment, described below.

Figure 2:
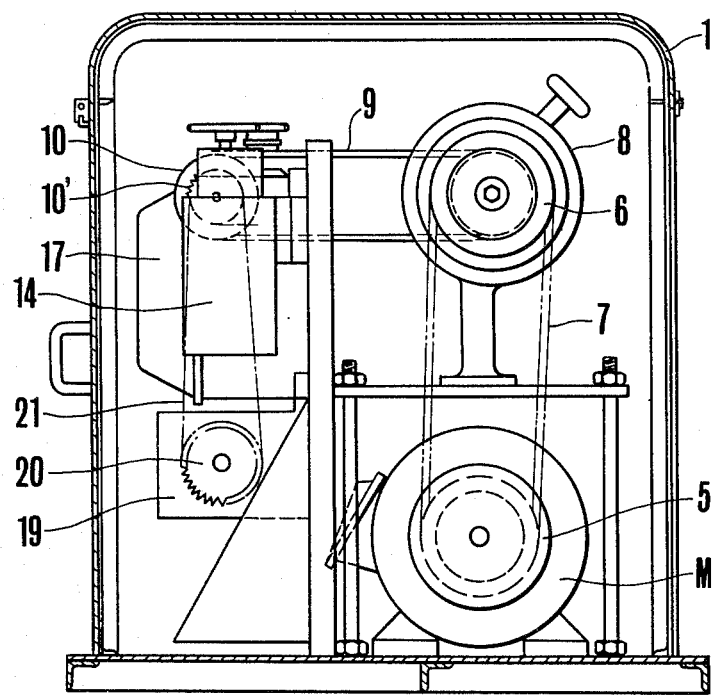
FIG. 2 is a view of the powered valve operating unit, with part of the housing broken away and sectioned to expose interior details.
Figure 3:
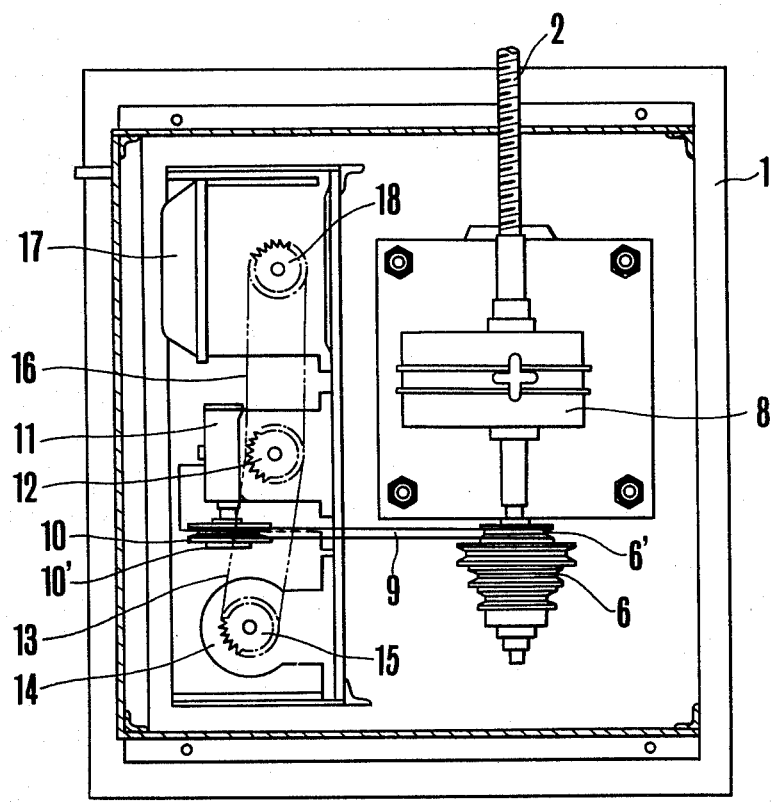
FIG. 3 is a top plan view of the powered valve operating unit, with part of the housing broken away and sectioned to expose interior details.

FIGS. 2 and 3 show the working parts of the unit 1, with the housing cut away and sectioned. M is a motor provided as a power supply; 5 and 6 are speed change pulleys with an endless belt 7 entrained between these pulleys. 8 is a clutch to connect and disconnect power between flexible shaft 2 and pulley 6. An endless belt 9 is entrained between a pulley 6' interlocking an adjoining speed change pulley 6 and the other pulley 10 of the reduction gear. An endless sprocket chain 13 is entrained between output side gear 12 of the said reduction gear and input side gear 15 of the degree openness transmitter 14.

Likewise, another endless sprocket entrained between the side gear 18 of the limit switch 17 and the other gear adjoining the said gear 12.

The remaining endless chain 21 is entrained between a gear 10' interlocking an adjoining pulley 10 and input gear 20 of the torque switch 19.

The said reduction gear 11 is mounted to reduce the revolution of the said flexible shaft 2 and to transmit the fractional or whole number of same revolutions as that of the worm wheel of attachment 3 to the limit switch 17 and the degree openness transmitter 14.

The limit switch can be set so that the revolution of gear 12 may be the same number as that of the worm wheel and the revolution of power supply may be stopped in case the revolution of the worm wheel attains the specified number. Torque switch 19 is equipped with a mechanism which can stop movement of motor M in case there is any torque exceeding specified value. The said mechanism functions as a safety device to prevent any accident due to any failure of torque limiter and limit switch 17 mounted on the shaft of pulley 6, or due to infiltration of any foreign matter.

The degree of openness transmitter 14 transmits a signal proportional to the degree of openness of valve V to a central operation panel 4 where the operating person, who is provided with this information, may stop motor operation when the valve attains a desired degree of openness.

Opening and closing of multiple valves may be similarly remote controlled at the central operation panel 4 where one or more degree of openness transmitters for multiple valves are mounted remote from the valves.

When a valve is opened and closed by means of the unit 10, the power supply circuit of the motor M is disconnected to stop the motor by means of the limit switch 17 when revolution of valve stem V'' reaches any predetermined number.

In case the degree of openness transmitter 14 is set to zero and a signal of valve opening is transmitted from the central operation panel, the motor is driven to open the valve and then is stopped as the power supply circuit of the motor M is disconnected by means of the limit switch 17 when the valve becomes fully opened. If it is necessary to maintain any specified degree of partial openness, any degree of openness transmitted by the degree of openness transmitter 14 is measured by a receiver 22 and when the degree of openness reaches the specified value, the power supply circuit of motor M is disconnected by means of an operating switch 23.

In case of any failure in the torque limiter or limit switch 17, torque switch 19 automatically actuates to stop the motor M. When closing any valve, reverse operation is performed.

The opening and closing operation may also be performed by means of subsidiary operating panel 4', located near the valve V and having a duplicate 23' of the operating switch and of the degree of openness indicator 22.

Note that when clutch 8 is put to operation in such a manner that it can disconnect with shaft 2 while motor M is moving, belt 9 causes reduction gear 11 to move, so that limit switch 17 and openness transmitter are placed under such a condition where both can not function to synchronize the actual degree of openness valve V, whereupon a correction should be made.

The central and subsidiary operating panels 4, 4' each include a degree of openness indicator for receiving degree of openness signals from the degree of openness transmitter 14, and for indicating them; a change-over switch, for opening and closing operation of the valve V; an indicator lamp for indicating that the valve is opening or closing, and a stop of power source indicator lamp, and the like.

The degree of openness transmitter is so designed that when the axle of the degree of openness transmitter is caused to rotate by means of receiving mechanical power, it functions to transmit electric signals corresponding to the angular displacement of the axle form a datum position, e.g., correspondingly to a completely closed condition of the valve.

Therefore, the degree of openness transmitter mechanically matches the valve opening and closing rate so that it functions synchronously with valve opening and closing action in such a way that angular displacement corresponding to these electric signals can be electrically transmitted to the degree of openness receiver, thus enabling it to indicate the degree of openness of the valve V at a remote location.

Means for sensing, sending, receiving and indicating a degree of openness for a valve are commercially available. One source of supply is the Densei line of precision indicating synchros, manufactured by Nippon Electric Co., Ltd., Tokyo, Japan. In such an instance, the "degree of openness transmitter" is a synchro transmitter, sometimes called a selsyn generator, and the "degree of openness indicator" is a synchro receiver, sometimes called a selsyn motor, provided with an indicator. Another source of supply is Midori Precisions Co., Ltd., Tokyo, Japan, whose equipment is called a Model H.P. multi-turn potentiometer.

It should now be apparent that the automatic, remote operator for manually operable valve, as described hereinabove, possesses each of the attributes set forth in the specification under the heading "Summary of the Invention" hereinbefore. Because the automatic, remote operator for manually operable valve of the invention can be modified to some extent without departing from the principles of the invention as they have been outlined and explained in this specification, the present invention should be understood as encompassing all such modifications as are within the spirit and scope of the following claims.

What is claimed is:

1. For a valve having a shaft rotatable through more than 360 degrees for fully opening the valve when it is fully closed and for fully closing the valve when it is fully open, an automated, remote opening and closing unit, comprising:

an electric motor having a rotary output shaft and being provided with a power supply means for providing electrical power for operating the motor to rotate the output shaft of the motor;

rotary power transmission means connecting the rotary output shaft with the rotatable shaft of the valve, so that rotation of the power transmission means in one sense normally opens the valve and rotation of the power transmission means in the opposite sense normally closes the valve;

a degree of openness transmitting means linked to the rotatable shaft of the valve, for normally providing a signal which is interpretable to provide an indication of the extent to which the valve that is being controlled is in an open condition;

a control panel disposed remotely from the valve to be controlled thereby;

the control panel including:

degree of openness receiver for receiving said signal and for providing as an interpretation thereof an indication of the extent to which the valve that is being controlled is in an open condition; and a power supply controlling switch means linked to the power supply for said motor and operable to provide the supply of power to the motor for rotating the power transmission means in both said one sense and said opposite sense to change the degree of openness of the valve, and for interrupting the supply of power to the motor for maintaining the valve at a selected degree of openness;

the rotary power transmission means including:

a speed reducer;

first endless belt means driving the speed reducer from the rotary output shaft of the motor;

limit switch means interposed in the power supply means and sensitive to the attainment by the valve of a fully open and a fully closed condition and for then interrupting application of rotary power to the rotatable shaft of the valve, in order to prevent over-torquing of the rotatable shaft once an extreme of rotation is reached;

second endless belt means between the speed reducer and the limit switch means and third endless belt means between the degree of openness transmitter, respectively, for coordinately driving the limit switch means and the degree of openness transmitter from the speed reducer.

2. The unit of claim 1, further including:

a torque limiting means for limiting the rotary force applied to the rotatable shaft of the valve, in order to prevent over-torquing of the rotatable shaft once the valve has become clogged or jammed.

3. The unit of claim 1 wherein the rotary power transmission means includes a reduction gearing means for providing slower rotation of the rotatable shaft of the valve compared to rotation of the rotary output shaft of the motor; and wherein the degree of openness transmitting means is linked to the rotatable shaft of the valve by like means for providing slower rotation, whereby the signal provided by the degree of openness transmitting means is directly related to the amount of rotation of the rotatable shaft of the valve.

* * * * *